United States Patent [19]

Nettleton et al.

[11] Patent Number: 5,638,162
[45] Date of Patent: Jun. 10, 1997

[54] OPTICAL SIGNAL ENHANCEMENT SYSTEM

[75] Inventors: John E. Nettleton, Fairfax Station; Dallas N. Barr, Woodbridge; Brian C. Redman, Alexandria, all of Va.

[73] Assignee: The United States of America as represented by the Secretary of the Army, Washington, D.C.

[21] Appl. No.: 494,749

[22] Filed: Jun. 26, 1995

[51] Int. Cl.[6] .............................. H01S 3/00; G01C 3/08; G01B 11/26
[52] U.S. Cl. ................. 356/4.02; 356/153; 359/159
[58] Field of Search ..................... 356/141.1, 152.3, 356/153, 4.02; 359/110, 159, 169, 170

[56] References Cited

U.S. PATENT DOCUMENTS 5,030,004  7/1991  Grant et al. ............................ 356/153
5,237,166  8/1993  Ito et al. ............................ 250/201.1

Primary Examiner—Mark Hellner
Attorney, Agent, or Firm—Milton W. Lee; John E. Holford; Alain L. Bashore

[57] ABSTRACT

An optical scheme and system involving a probe laser with simple analog processing to detect an optical echo. This allows verification that a transmitter has hit a target receiver or will allow synchronized firing with another laser transmitter.

2 Claims, 2 Drawing Sheets

OPTICAL SIGNAL ENHANCEMENT SYSTEM

BACKGROUND OF THE INVENTION

1. Field of the Invention

The present invention generally relates to optical signal compensation systems and techniques and more specifically, to atmospheric turbulence and pointing jitter enhancement systems and techniques for aiming laser beams at retro-reflective means.

2. Description of Prior Art

Currently, there are several passive and active alternative approaches for jitter and atmospheric turbulence compensation. But these approaches all have major disadvantages which severely limit their usefulness. The simplest approach is to merely enlarge the transmitted laser beam divergence to "hit" the receiver. While a larger beam divergence mitigates the effects of transmitter pointing jitter and atmospheric turbulence induced beam wander, it unfortunately does not compensate for atmospheric turbulence scintillation and requires much more laser energy. Another passive approach is to use a stabilized pointing system to aid in hitting the receiver. This approach tends to be mechanically complicated, expensive, and only compensates for jitter with no turbulence compensation. Adaptive optic compensation is an active approach that compensates for jitter and atmospheric turbulence. This is a promising technology but current implementations are extremely complicated, bulky, fragile and expensive.

While the prior art has reported using passive and active approaches to optical signal compensation techniques none have established a basis for a specific apparatus that is dedicated to the task of resolving the particular problem at hand. What is needed in this instance is an atmospheric turbulence and pointing jitter compensation system and technique for aiming laser beams at retro-reflective means that is optically and electronically simple and compact.

SUMMARY OF THE INVENTION

It is therefore one object of the invention to provide an atmospheric turbulence and pointing jitter enhancement system and technique for aiming laser beams at retro-reflective means that is optically and electronically simple and compact.

According to the invention, there is disclosed a system for optical signal compensation of atmospheric turbulence and jitter. A laser means continuously transmits or outputs a stream of pulses to probe for a retro-reflective optical receiver. An optical receiver reflects back sufficient energy return via a mirror through a lens to be detected by an optical echo detector and amplifier to detect due to the "cat's eye" retro reflection effect. This detected optical echo signal is then processed utilizing a processor in which the signal is compared to a selected threshold utilizing: electronic filters (such as a lowpass filter), and compare and control electronics (such as a comparitor). If the signal exceeds the given threshold a verification signal is given. The verification signal is simply a "high" voltage level from the compare electronics which indicates that the optical path between the transmitter and the receiver is such that the transmitted laser radiation actually arrived at the receiver (due to atmospheric turbulence and pointing jitter, this is not always the case). A "low" voltage level from the compare electronics indicates the beam may not be hitting the receiver. The use of an array of detectors (e.g. 2×2 elements) can give the operator a direction to move to correct aim point error. When the pointing verification signal is "high" the probe laser can be modulated to transmit information to the receiver or adjunct laser may be operated for the same purpose.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
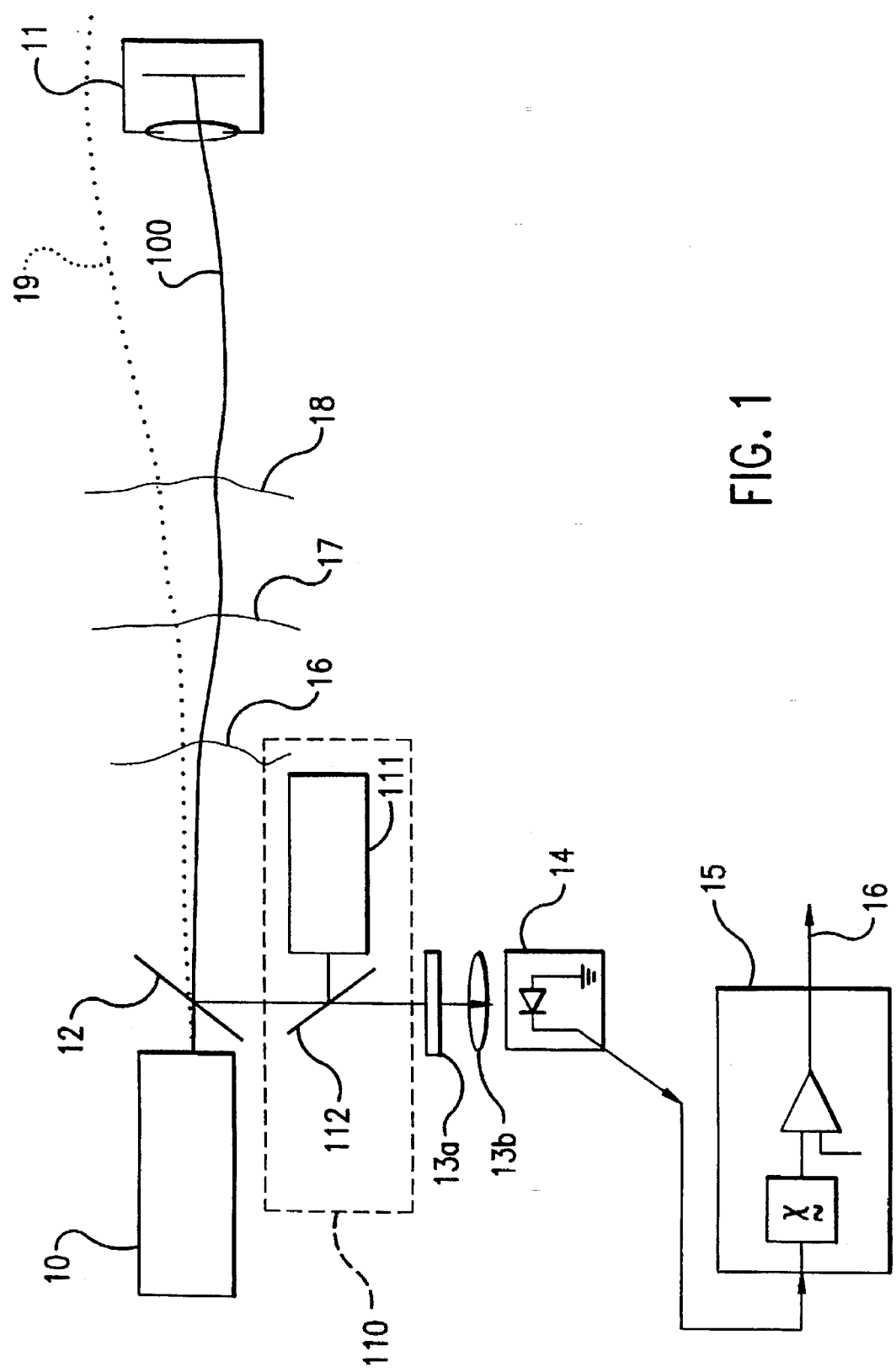
FIG. 1 is a system diagram of the first and second embodiments of the present invention superimposed over transmitted optical signals.

Referring now to the drawings, and more particularly to FIG. 1, there is shown the first and second embodiments of the present invention. In the first embodiment, laser means 10 continuously transmits or outputs a stream of pulses to probe for a retro-reflective optical receiver 11. Laser means 10 may be a low power, eyesafe light emitting diode (LED), laser diode or micro-laser. Optical receiver 11 reflects back sufficient energy return via mirror 12, through an optical bandpass filter 13a and lens 13b, to be detected by optical echo detector and amplifier 14 to detect due to the "cat's eye" retro reflection effect. This detected optical echo signal is then processed utilizing processor 15 in which the signal is compared to a selected threshold utilizing: electronic filters (such as a lowpass filter), and compare and control electronics (such as a comparitor). If the signal exceeds the given threshold a pointing verification signal 16 is given. Pointing verification signal 16 is simply a "high" voltage level from the compare electronics which indicates that the optical path between the transmitter and the receiver is such that the transmitted laser radiation actually arrived at the receiver (due to atmospheric turbulence and pointing jitter, this is not always the case). A "low" voltage level from the compare electronics indicates the beam may not be hitting the receiver. The use of an array of detectors (e.g. 2×2 elements) can give the operator a direction to move to correct aim point error. When the pointing verification signal is "high" the probe laser can be modulated to transmit information to the receiver or adjunct laser 110 may be operated for the same purpose.

The invention, if used for low bandwidth laser communications, can assure nearly 100% message transmission at much lower powers or, if coupled with a separate adjunct laser device, such as a high bandwidth burst mode communications laser, can compensate for atmospheric and jitter induced beam wander using synchronized firing. In FIG. 1 turbulence is represented by lines 16 through 18. Two separate signals are shown as sent: signal 19 at a first time interval designated as "time 1", and signal 100 at a second and later time interval designated as "time 2".

The second embodiment of the invention as shown in FIG. 1 is the addition of subsystem 110 which includes adjunct laser 111 and beam splitter 112, thereby allowing synchronized firing with an adjunct laser transmitter. For this case, the probe transmitter operates at a much higher duty factor than the laser transmitter it will synchronize. The two beams are optically overlaid to insure that they share the same optical path. The probe samples the jitter and atmospheric turbulence conditions, and when these conditions are favorable (there is an optical path to the target receiver) the processor signals the adjunct laser to fire before these favorable conditions change. This insures that the adjunct laser beam follows the same optical path to the target receiver before atmospheric turbulence or jitter can change the optical path. This synchronized firing scheme compensates for jitter and atmospheric turbulence. The synchronized firing can be utilized by high bandwidth, pulsed laser communications. Received intensity levels may also be controlled by selection of the echo signal threshold level. The adjunct and probe lasers are likely to be operated at different wavelengths and/or polarizations to allow efficient separation of the beams at both the distant receiver/retro reflector and the local probe detector. This separation is accomplished by dichronic or polarization beam splitters.

Figure 2:
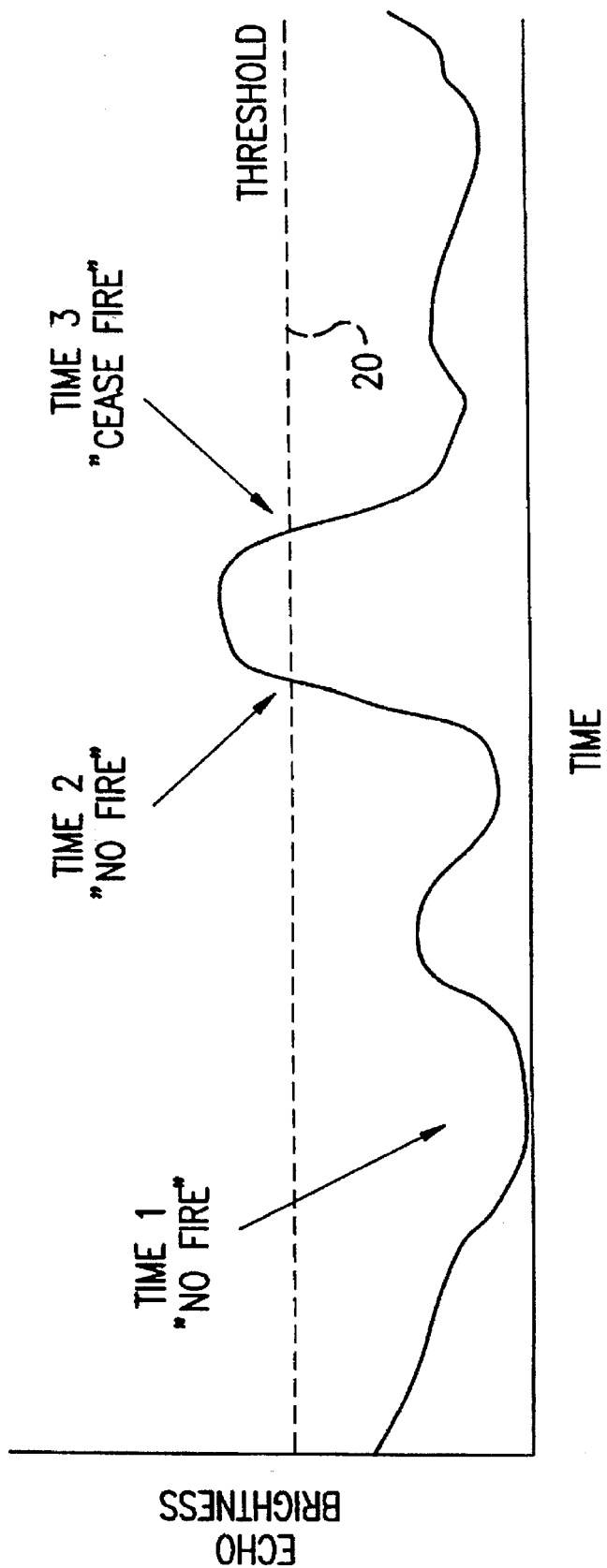
FIG. 2 is a plot of the echo brightness versus time for all detected optical echo signals for the first embodiment shown in FIG. 1.

FIG. 2 is a plot of the echo brightness versus time for all detected optical echo signals. As seen in FIG. 2, no pointing verification signal will be given for "time 1" since signal 19 of FIG. 1 is not greater than the given threshold 20 of FIG. 2. A pointing verification signal will be given from "time 2" to "time 3" since signal 100 of FIG. 1 is greater than the given threshold 20 of FIG. 2. The synchronized firing compensates for jitter and atmospheric turbulence induced beam wander and scintillation. It also indicates time windows when alignment is sufficient for energy delivery to the receiver. Received intensity may also be controlled by selection of echo signal threshold level 20.

The system of the present invention includes: a continuous wave (cw) or a rapidly pulsed narrow band optical probe transmitter, an optical echo detector and amplifier, optical bandpass filters, compare and control electronics and a target that can be an optical receiver, that exhibits the retro reflection effect, or cooperative optical corner cube. The probe transmitter can either be a light emitting diode, laser diode or micro-laser depending on range requirements with the LED approach being the most limited. The transmitter can be continuous or pulsed. The optical echo detector for the system is a photo-diode, such as: an avalanche photo-diode (APD) or a simple p-n junction (PIN) photo diode. The APD is the more sensitive of the two types of detectors. The bandpass optical filter will aid in rejection of background optical/solar clutter which will improve the systems obtainable signal-to-noise ratio. The optical filter has its spectral width matched to the probe transmitter's spectral width. The optical echo signal is amplified and then passed to the electronic processor.

There are a variety of methods for establishing the threshold level for pointing verification. The simplest is a user selectable fixed threshold as described above. A time decaying threshold can also be an option. The electronic processor can also automatically establish the threshold level based on the signal strength of the optical echoes averaged over some desired period of time. The threshold level will be some factor above this average value of the detected echo signal; this factor will be user selected. The target receiver can be an optical system that includes a lens system that focuses onto a focal plane to produce the retro reflection effect, or it can be a cooperative corner cube (possibly modulated) to provide robust optical echoes. Simple range processing of the echo signal, such as time of flight for the pulsed probe and amplitude modulation or phase correlation for the cw probe, to determine range to the target receiver that generates the optical echo is possible. It is also possible to verify data transmission for communications using this system. The system is compatible with both digital and analog communication schemes whether the pulsed probe or cw probe is used.

The preferred embodiment of the present invention is as a hand held system. The probe laser is a LaserMax, Model MDL 830-30 diode laser, of Rochester, N.Y., and the detector is a Hamamatsu Model C5331-02 Silicon ADP, of Bridgewater, N.J. The optical mirrors are standard mirrors, while the lens is a central perforated type. Electronics consist of a 555 timer which produces trigger pulses to fire the laser and a transistor and associated bypass resistor network to enable rapid pulsing of the laser drive current. The receiver consists of an active low pass amplifier in three stages (LF351 and LF353 op amps) to prepare the signal for the LM339 comparitor which produces the pointing verification signal. The second embodiment consists of the addition of a LaserMax Model MDL 690-30 diode laser and a custom fabricated dichronic beam splitter/combiner, by Lightning Optical Corporation of Tarpon Springs, Fla., which combines the two beams.

The present invention, shown in two embodiments, has much greater application flexibility than any current jitter and/or atmospheric turbulence laser energy delivery approach. It compensates for both jitter and atmospheric turbulence, is optically and electronically simple and compact. Depending on the threshold setting selected by the user, the advantage of using the probe laser in the second embodiment, as an increased factor of power received at the target can be as large as approximately a factor of three.

While this invention has been described in terms of preferred embodiment consisting of the two embodiments disclosed, those skilled in the art will recognize that the invention can be practiced with modification within the spirit and scope of the appended claims.

Having thus described my invention, what we claim as new and desire to secure by Letters Patent is as follows:

1. A system for optical signal enhancement when propagating through a changing optical path due to atmospheric turbulence and jitter, comprising:

means for ouputing a stream of optical signals along an optical path degraded by atmospheric turbulence and jitter;

means for retro-reflecting the optical signals as retro-reflected optical signals;

means for filtering the retro-reflected optical signal to output a filtered retro-reflected optical signal;

means for detecting the filtered retro-reflected optical signals to output a detector signal;

means for processing the detector signal such that if the detector signal exceeds a predetermined threshold an alignment verification signal is output;

means for monitoring the changing optical path such that the stream of optical signals are transmitted when the pointing verification signal is present.

2. The system of claim 1 wherein there is further included a means for outputing a second stream of optical signals along the optical path which would activate only when the verification signal is present.

\* \* \* \* \*